US008666232B2

(12) United States Patent
Tani

(10) Patent No.: US 8,666,232 B2
(45) Date of Patent: Mar. 4, 2014

(54) IMAGE AND SOUND REPRODUCING APPARATUS FOR REPRODUCING AN AUDIO VISUAL INTERLEAVING FILE FROM RECORDING MEDIUM

(75) Inventor: Hirofumi Tani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 246 days.

(21) Appl. No.: 13/115,429

(22) Filed: May 25, 2011

(65) Prior Publication Data

US 2011/0299829 A1   Dec. 8, 2011

(30) Foreign Application Priority Data

Jun. 2, 2010  (JP) ................................. 2010-126621

(51) Int. Cl.
*H04N 5/783* (2006.01)
(52) U.S. Cl.
USPC ........................................................ 386/344
(58) Field of Classification Search
USPC .............................. 709/231; 386/344, 343, 351
See application file for complete search history.

(56) References Cited

U.S. PATENT DOCUMENTS

| | | | |
|---|---|---|---|
| 5,627,936 A | | 5/1997 | Prasad et al. |
| 5,630,005 A | * | 5/1997 | Ort ................................. 386/351 |
| 6,157,771 A | * | 12/2000 | Brewer et al. .................. 386/343 |
| 6,920,181 B1 | * | 7/2005 | Porter ....................... 375/240.28 |
| 7,106,944 B2 | * | 9/2006 | Graan ........................... 386/343 |
| 7,512,311 B2 | * | 3/2009 | Kaku ............................ 386/353 |
| 7,519,274 B2 | * | 4/2009 | Li .................................. 386/248 |
| 7,975,255 B2 | * | 7/2011 | Kosov et al. ................... 717/120 |
| 2002/0196714 A1 | * | 12/2002 | Tada et al. .................. 369/30.12 |
| 2005/0123283 A1 | | 6/2005 | Li |
| 2006/0129909 A1 | | 6/2006 | Butt et al. |
| 2007/0003251 A1 | | 1/2007 | Chung et al. |
| 2007/0031110 A1 | * | 2/2007 | Rijckaert ......................... 386/68 |
| 2007/0286585 A1 | * | 12/2007 | Moon et al. .................... 386/125 |
| 2008/0310818 A1 | | 12/2008 | Kim et al. |
| 2009/0132721 A1 | * | 5/2009 | Soroushian et al. .......... 709/231 |
| 2010/0064145 A1 | * | 3/2010 | Hirota et al. .................. 713/193 |
| 2010/0322045 A1 | * | 12/2010 | Ma .............................. 369/30.23 |

FOREIGN PATENT DOCUMENTS

| | | |
|---|---|---|
| JP | 2003-289504 | 10/2003 |
| JP | 2006-217126 | 8/2006 |
| JP | 2006-526245 | 11/2006 |
| JP | 2008-257767 | 10/2008 |

OTHER PUBLICATIONS

Free software from the GNU library, "Section—element avidemux", copyright 2006.*
Extended European Search report from corresponding EP application 11167192, dated Nov. 4, 2011.

* cited by examiner

*Primary Examiner* — David Harvey
(74) *Attorney, Agent, or Firm* — Morgan, Lewis & Bockius LLP

(57) ABSTRACT

An image voice play apparatus for playing an AVI file includes: a control portion that when an instruction for a time search is issued, estimates the "number of voice chunks in one movi chunk," determines in which AVI chunk a voice chunk for the time search is situated, reads an idx1 chunk in the "determined AVI chunk" without reading an idx1 chunk in an AVI chunk other than the "determined chunk," and determines a play start position that corresponds to the time search.

5 Claims, 4 Drawing Sheets

FIG.2

| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |
|---|---|---|---|
| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |
| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |
| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |
| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |
| AV IDENTIFICATION CODE<br>4 BYTRES<br>(EXAMPLE: "00DC" :IMAGE<br>"01WB" :VOICE<br>"02SB" :SUB-TITLE<br>"JUNK" :JUNK) | FLAG<br>4 BYTES<br>NO SPECIAL<br>MEANING | OFFSET<br>4 BYTES<br>OFFSET FROM<br>MOVI HEAD | SIZE<br>4 BYTES<br>LENGTH OF<br>STREAM DATA |

IMAGE AND SOUND REPRODUCING APPARATUS FOR REPRODUCING AN AUDIO VISUAL INTERLEAVING FILE FROM RECORDING MEDIUM

This nonprovisional application claims priority under 35 U.S.C. §119 (a) on Patent Application No. 2010-126621 filed in Japan on Jun. 2, 2010, the entire contents of which are hereby incorporated by reference.

BACKGROUND OF THE INVENTION

1. Field of the Invention

The present invention relates to an image voice play apparatus, more particularly, to an image voice play apparatus that plays an AVI (Audio Visual Interleaving) file.

2. Description of the Related Art

Conventionally, various image voice play apparatuses that play an AVI file are developed. Here, FIG. 1 shows a structure of an AVI file.

An AVI file includes at least one AVI chunk. Here, FIG. 1 shows an exemplary AVI file that includes three AVI chunks. And, each AVI chunk is composed of: a head chunk; an idx1 chunk; and a movi chunk. In the movi chunk, basically an image chunk (00 dc chunk) and a voice chunk (01 wb chunk) are alternately arranged; however, in some cases, a chunk other than the image chunk and the voice chunk is included. As the chunk other than the image chunk and the voce chunk, there are a sub-title chunk (02 sb chunk), a junk chunk and the like.

As shown in FIG. 1, one image chunk is image data for one frame, and one voice chunk is voice data for one frame.

Besides, as shown in FIG. 1, each head chunk stores a playing time for one image chunk, a playing time for one voice chunk, and the number of image chunks that are contained in a movi chunk in an AVI chunk to which the head chunk itself belongs.

When it is supposed that a playing time of an m-th image frame is t, and a playing time of an n-th voice frame is t, the following formula is met. In the AVI file, a physical synchronization between the image chunk and the voice chunk is not secured, m and n usually have different values.

$m=t$/(the playing time for one image chunk)

$n=t$/(the playing time for one voice chunk)

As is clear from the above formula, obtaining an image chunk and a voice chunk corresponding to a playing time is determining which-address image chunk the image chunk corresponding to the playing time is and determining which-address voice chunk the voice chunk corresponding to the playing time is.

Each idx1 chunk has a form shown in FIG. 2 and stores playing times and position information of an image chunk and a voice chunk that are contained in a movi chunk in the AVI chunk to which the idx1 chunk itself belongs. In each idx1 chunk, information of all kinds of chunks, which is contained in the movi chunk in the AVI chunk to which the idx1 chunk belongs, is written in 16 bytes for one chunk. Further, each idx1 chunk writes the size (data amount) of itself in the head of itself.

In a conventional image voice play apparatus, when executing a time search for an AVI file, to obtain a play position, it is necessary to count the number of voice chunks and the number of image chunks from the head of the first idx1 chunk.

For example, in the conventional image voice play apparatus, if a 50-minute time search is specified targeting a 60-minute AVI file that has a playing time of ⅓₀ sec. for one voice chunk and includes three AVI chunks which are 20 minutes long each, first, the number of voice chunks is counted from the head of the first idx1 chunk. Even if the reading is performed to the last of the first idx1 chunk, 90000 (=50×60×30) which is the desired number of voice chunks is not reached; accordingly, subsequently, the number of voice chunks is counted from the head of the second idx1 chunk. Even if the reading is performed to the last of the second idx1 chunk, 90000 (=50×60×30) which is the desired number of voice chunks is not reached; accordingly, subsequently, the number of voice chunks is counted from the head of the third idx1 chunk. During the reading of the third idx1 chunk, the 90000th voice chunk is located and the counting of the number of voice chunks ends.

As described above, in the conventional image voice play apparatus, when executing a time search for an AVI file, to obtain a play position, it is necessary to count the number of voice chunks from the head of the first idx1 chunk, so that there is a problem that the time search process tales a long time.

Here, JP-A-2006-526245 discloses a method that determines to which chunk the number of chunks corresponding to a start position of a file that a terminal requests a server belongs; however, this is a determination method which supposes that the size of a chunk except a header portion is known, so that the method is inapplicable to a time search for an AVI file.

Besides, JP-A-2003-289504 discloses that if an index is not valid, an estimated position is calculated from a specified playing time and an average bit rate of an MPEG-2 stream instead of the index; however, even if this technology is used for a time search process for an AVI file, it is impossible to quickly locate a voice chunk that corresponds to the desired number of voice frames.

Besides, JP-A-2006-217126 discloses that in playing an AVI stream, control which repeats a search changing the search area and the stream input position is performed to locate a 4-byte code that is closest to the play start position, and the play is performed from the correct play start position; however, even if this technology is used for a time search process for an AVI file, it is impossible to quickly locate a voice chunk that corresponds to the desired number of voice frames.

SUMMARY OF THE INVENTION

It is an object of the present invention to provide an image voice play apparatus that is able to shorten a time required for a time search for an AVI file.

To achieve the above object, an image voice play apparatus according to the present invention is an image voice play apparatus for playing an AVI file and has a structure that includes a control portion that when an instruction for a time search is issued, estimates "the number of voice chunks in one movi chunk," determines in which AVI chunk a voice chunk for the time search is situated, reads an idx1 chunk in the "determined AVI chunk" without reading an idx1 chunk in an AVI chunk other than the "determined chunk," and determines a play start position that corresponds to the time search process.

According to such a structure, when executing a time search for an AVI file, if a voice chunk for the time search is not situated in the first AVI chunk, it becomes unnecessary to count the number of voice chunks from the head of the first idx1 chunk, so that it is possible to shorten a time required for the time search.

Besides, from the viewpoint for increasing the accuracy of a voice play start position that corresponds to the time search, it is desirable that the above control portion estimates the "number of voice chunks in one movi chunk" by using the size of an idx1 chunk, the number of image chunks in the one movi chunk, and the "number of chunks other than image chunks and voice chunks in the one movi chunk." In this case, for example, the control portion, during a playing time of the AVI file, corrects "the number of chunks other than image chunks and voice chunks in the one movi chunk" or the above image voice play apparatus may incorporate a recording function; and the control portion, during a recording time of the AVI file, may correct the "above number of chunks other than image chunks and voice chunks in the one movi chunk."

DESCRIPTION OF THE DRAWINGS

FIG. 2 is a diagram showing a structure of an idx1 chunk.

DETAILED DESCRIPTION OF THE PREFERRED EMBODIMENTS

Embodiments of the present invention are described hereinafter wither reference to the drawings. Here, a DVD play apparatus is described as an example of an image voice play apparatus according to the present invention.

Figure 1:
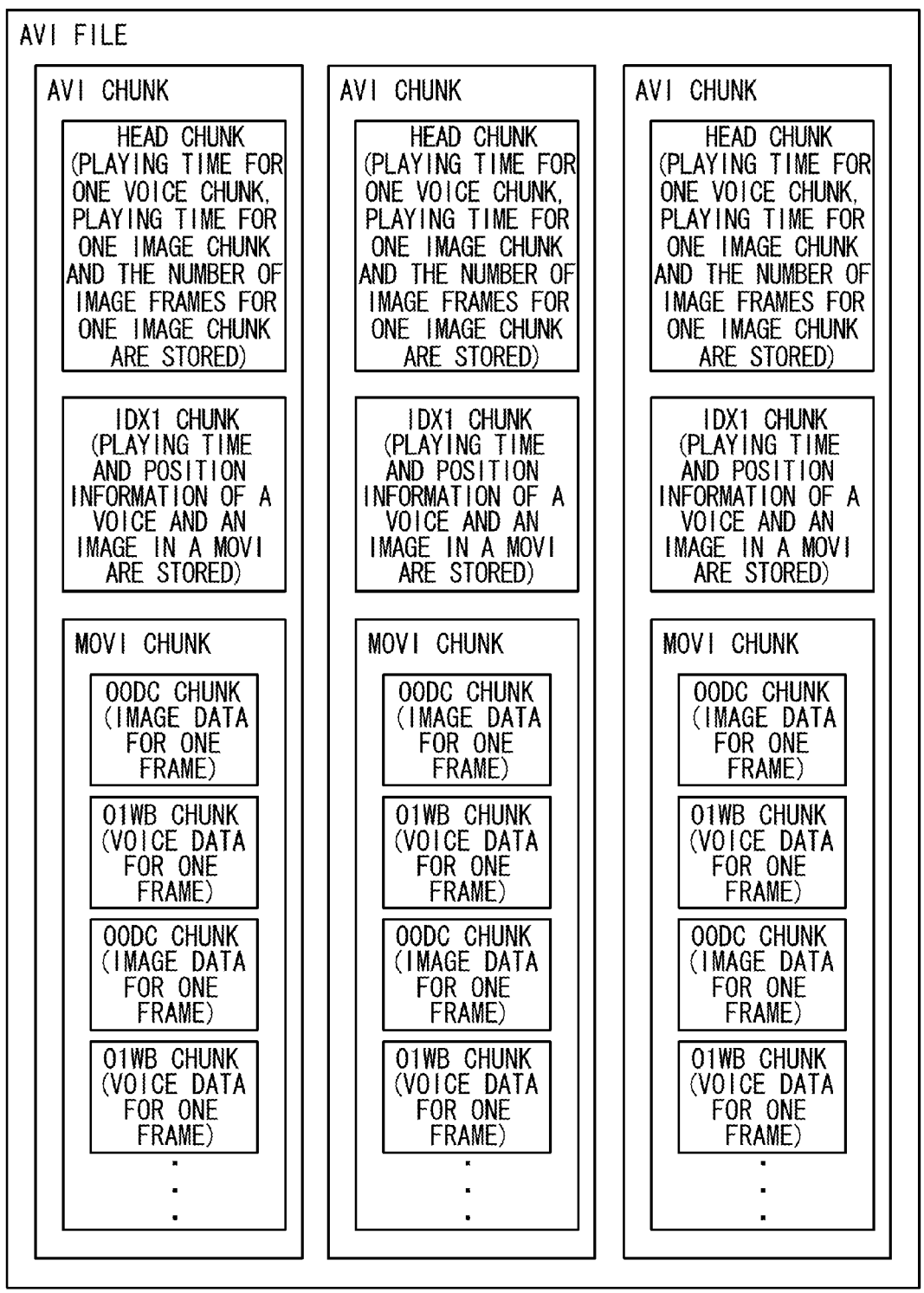
FIG. 1 is a diagram showing a structure of an AVI file.
Figure 3:
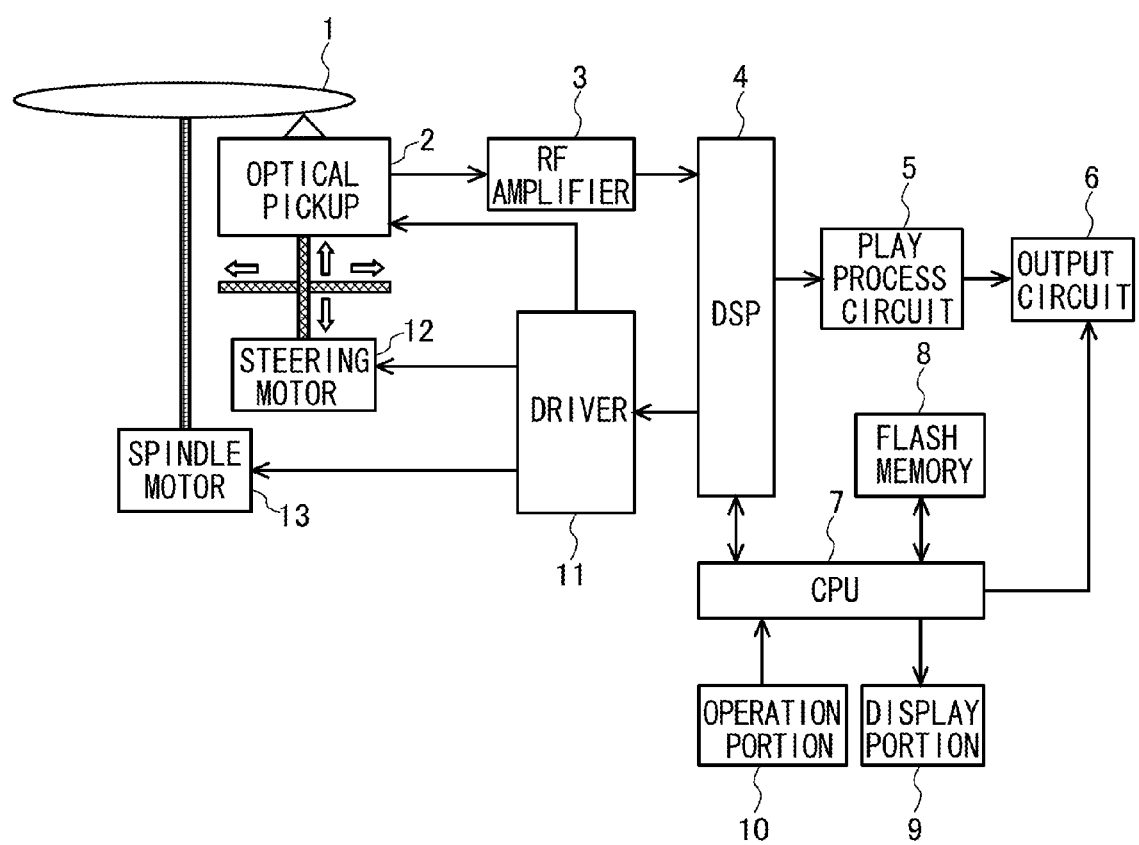
FIG. 3 is a diagram showing a schematic structural example of a DVD play apparatus according to an embodiment of the present invention.

FIG. 3 is shows a schematic structural example of a DVD play apparatus according to an embodiment of the present invention. The DVD play apparatus shown in FIG. 3 according to the embodiment of the present invention is an apparatus that plays a DVD1, and includes: an optical pickup 2; an RF amplifier 3; a DSP (Digital Signal Processor) 4; a play process circuit 5; an output circuit 6; a CPU (Central Processing Unit) 7; a flash memory 8; a display portion 9; an operation portion 10; a driver 11; a steering motor 12; and a spindle motor 13. The operation portion 10 includes a remote-control reception portion that receives a remote control signal transmitted from a remote control transmitter (not shown).

The optical pickup 2 directs a light beam to the DVD1 to read various information such as voice information, image information and the like that is recorded on the DVD1.

The voice information and image information obtained by the optical pickup 2 is converted into a voice and an image by signal processes of the RF amplifier 3, the DSP 4, the play process circuit 5 and the output circuit 6; and output to a speaker and a monitor (not shown) of a television receiver that is connected to the DVD play apparatus shown in FIG. 3 according to the embodiment of the present invention. The RF amplifier 3 amplifies the voice signal, the image signal an the like from the optical pickup 2. The DSP 4 and the play process circuit 5 apply various information processes (e.g., an image process and the like) to the signal output from the RF amplifier 3.

The output circuit 6 includes an OSD (On Screen Display) portion (not shown). The OSD portion combines the image signal received from the play process circuit 5 and OSD image data generated based on an instruction from the CPU 7 with each other; outputs the image signal as it is which is received from the play process circuit 5 without performing the combination process; or outputs the OSD image data as they are which are generated based on the instruction from the CPU 7 without performing the combination process.

The output circuit 6 applies a D/A conversion process and the like to the voice signal received from the play process circuit 5 and the output signal from the OSD portion to output them to the speaker and the monitor (not shown) of the television receiver that is connected to the DVD play apparatus shown in FIG. 3 according to the embodiment of the present invention.

The CPU 7 and the driver 11 control the operation of the optical pickup 2 and the operation of a drive portion that includes the steering motor 12 and the spindle motor 13. The CPU 7 receives information from the operation portion 10, transmits the information to the DSP 4, and transmits information from the DSP 4 to the display portion 9. Besides, the driver 11, based on an instruction from the DSP 4, controls the operation of the optical pickup 2 and the operation of the above drive portion.

The steering motor 12 is driven by the driver 11 that operates based on the instruction from the DSP 4. Thanks to the driving of the steering motor 12, the optical pickup 2 moves in a radial direction of the DVD1 and a thickness direction of the DVD1. The spindle motor 13 is driven by the driver 11 that operates based on the instruction from the DSP 4. Thanks to the driving of the spindle motor 13, the DVD1 rotates.

Further, the driver 11, based on the instruction form the DSP 4, performs focus control as well of an objective lens (not shown) in the optical pickup 2.

Next, an operation, in which the DVD play apparatus shown in FIG. 3 according to the embodiment of the present invention plays an AVI file that is recorded in the DVD1, is described with reference to a flow chart in FIG. 4.

Figure 4:
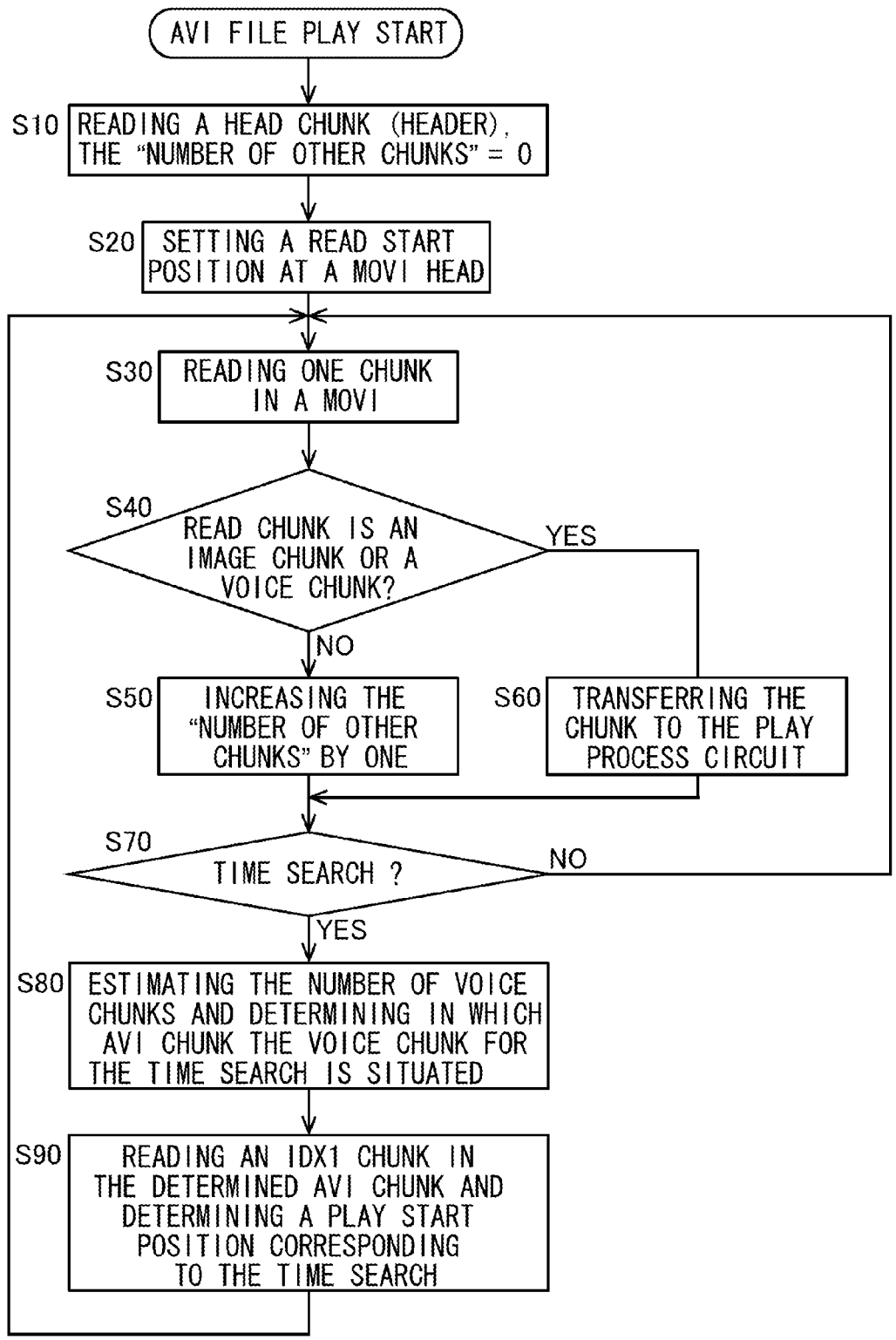
FIG. 4 is a flow chart showing an AVI file play operation of the DVD play apparatus shown in FIG. 3 according to the embodiment of the present invention.

If a user performs an operation for issuing an instruction for playing an AVI file on the operation portion 10 or the remote control transmitter, an operation of the flow chart in FIG. 4 starts.

First, in a step S10, the CPU 7 reads a head chunk of an AVI file from the DSP 4; sets "the number of other chunks (the number of chunks other than image chunks and voice chunks)" in each of all movi chunks at 0; and temporarily stores the numbers in an internal memory (not shown in FIG. 3).

In a subsequent step S20, the CPU 7 sets a read start position at a head chunk of a movi chunk that belongs to the first AVI chunk.

In a subsequent step S30, the CPU 7 reads one chunk in a movi chunk that is a read target.

In a subsequent S40, the CPU 7 checks whether the chunk read in the step S30 is an image chunk or a voice chunk.

If the chunk read in the step S30 is not an image chunk nor a voice chunk (NO in the step S40), the CPU 7 increases by one the "number of other chunks" in the movi chunk to which the read chunk belongs, stores the number into the internal memory (step S50), thereafter moves on to a subsequent step S70.

On the other hand, if the chunk read in the step S30 is an image chunk or a voice chunk (YES in the step S40), the CPU 7 transfers the read chunk from the DSP 4 to the play process circuit 5 (step S60), thereafter moves on to the step S70.

In the step S70, the CPU 7 checks whether an operation for issuing an instruction for a time search is performed on the operation portion 10 or the remote control transmitter.

If the operation for issuing an instruction for a time search is not performed on the operation portion 10 nor the remote control transmitter (NO in the step S70), the CPU 7 returns to the step S30 to read the next chunk.

On the other hand, if the operation for issuing an instruction for a time search is performed on the operation portion 10 or the remote control transmitter (YES in the step S70), the CPU 7 estimates the number of voice chunks in one movi chunk and determines in which AVI chunk the voice chunk for the time search is situated (step S80).

The movi chunk is composed of image chunks, voice chunks, and other chunks (chunks other than the image chunks and the voice chunks), so that it is possible to express the number of voice chunks in one movi chunk by the following formula (1). Here, the following ((the size of an idx1 chunk)/16) represents the total number of chunks in one movi chunk (see FIG. 2). (the number of image chunks), that is, the number of image chunks in one movi chunk is stored in the head chunk that is read in the step S10. Besides, the size of the idx1 chunk is written in the head of the idx1 chunk.

$$\text{(the number of voice chunks)}=((\text{the size of an idx1 chunk})/16)-(\text{the number of image chunks})-(\text{the number of other chunks}) \quad (1)$$

As long as all the chunks in the movi chunk are not read, the true value of (the number of other chunks) is unclear, so that in the step S80, obtaining the number of voice chunks in one movi chunk by using the above formula (1) is estimating the number of voice chunks in the one movi chunk.

In a subsequent step S90, the CPU 7 reads the idx1 chunk in the AVI chunk that is determined in the step S80, determines the play start position that corresponds to the time search, and returns to the step S30.

Here, specific examples of the processes in the step S80 and the step S90 are described. For example, if a 50-minute time search is specified targeting a 60-minute AVI file that has a playing time of 1/30 sec. for one voice chunk and includes three AVI chunks which are 20 minutes long each, the first idx1 chunk is not read and the number of voice chunks in the first idx1 chunk is estimated by means of the above formula (I), and it is confirmed that 90000 (=50×60×30) which is the desired number of voice chunks is not reached. Then, the second idx1 chunk is not read and the number of voice chunks in the second idx1 chunk is estimated by means of the above formula (I), and it is confirmed that 90000 (=50×60×30) which is the desired number of voice chunks is not reached even if the number of voice chunks in the first idx1 chunk and the number of voice chunks in the second idx1 chunk are summed In this way, the CPU 7 determines that the voice chunk (the 90000th voice chunk) for the time search is situated in the third AVI chunk. Then, the number of voice chunks is counted from the head of the third idx1 chunk. During the reading of the third idx1 chunk, the 90000th voice chunk is located and the voice play start position corresponding to the time search is determined Here, the image play start position corresponding to the time search is determined by means of the playing time for one image chunk that is stored in the head chunk and the number of image chunks in the idx1 chunk.

According to the above operation, when executing a time search for an AVI file, if a voice chunk for the time search is not situated in the first AVI chunk, it becomes unnecessary to count the number of voice chunks from the head of the first idx1 chunk, so that it is possible to shorten a time required for the time search process.

Besides, according to the above operation, "the other chunks (chunks other than the image chunks and the voice chunks)" that are actually counted in a portion that is already played are reflected onto "the number of other chunks." In this way, the more the play times before a time search, the closer the voice play start position corresponding to the time search is able to be brought to the true position.

The embodiments according to the present invention are described above; however, the scope of the present invention is not limited to these embodiments: it is possible to add various alterations and put them into practice without departing from the spirit of the present invention.

For example, in the above embodiments, the "number of other chunks" is stored in the internal memory; however, instead, the "number of other chunks" may be related to identification information (e.g., a file name) of the AVI file and stored into the flash memory 8 in a non-volatile manner In this case, even after a power supply of the DVD play apparatus is turned off, the "number of other chunks" continues to be stored, so that it is possible to effectively use the "number of other chunks" during a time of a later time search.

Besides, the image voice play apparatus according to the present invention is not limited to a play-dedicated apparatus, and may incorporate a recording function as well besides the play function. As specific examples, there are a DVD record and play apparatus, a hard disc recorder and the like. As described above, in the case where the image voice play apparatus according to the present invention incorporates the recording function as well, unlike the above embodiments, the "number of other chunks" may be recorded in a recording medium in which the AVI file is recorded. In the case where the "number of other chunks" is recorded into the recording medium in which the AVI file is recorded, a method in which the "number of other chunks" is related to the identification information (e.g., a file name) of the AVI file and recorded, and a method in which the "number of other chunks" is added to the AVI file to update the AVI file are conceivable. Further, in the case where the image voice play apparatus according to the present invention incorporates the recording function as well, the "number of other chunks" may be corrected during a recording time of the AVI file without correcting the "number of other chunks" during a playing time as in the step S50 shown in FIG. 4. In this case, at a time the recording of the AVI file is completed, the "number of other chunks" becomes the true value.

Besides, the accuracy of the voice play start position that corresponds to the time search will come to fall; however, in the above embodiments, it is also possible to make a variation in which the process in the step S50 shown in FIG. 4 is not performed; and if the chunk read in the step S30 is not an image chunk nor a voice chunk (NO in the step S40), the CPU 7 directly moves on to the step S70.

What is claimed is:

1. An image sound play reproducing apparatus for reproducing an AVI file from a recording medium, comprising:
   a reading element that reads information recorded in the recording medium; and
   a controller element that controls the reading element,
   wherein the AVI file comprises a plurality of AVI chunks, each of the AVI chunks comprising an idx1 chunk, an image chunk, and a sound chunk, and
   wherein the controller element performs:
   a checking that checks whether or not an instruction for a time search is issued;
   an estimation that, when the checking finds that an instruction for a time search was issued, estimates "the number of sound chunks in one AVI chunk";
   a first determination that determines, based on a result of the estimation, in which AVI chunk a sound chunk for the time search was included; and
   a second determination that makes the reading element read an idx1 chunk in the "determined AVI chunk" without making the reading element read an idx1 chunk in an AVI chunk other than the "determined AVI chunk," and determines a reproducing start position that corresponds to the time search.

2. The image sound play reproducing apparatus according to claim 1, wherein the estimation estimates the "number of sound chunks in the one AVI chunk" by using a data amount of the idx1 chunk, the number of image chunks in the one AVI chunk, and the "number of chunks other than an image chunk and a sound chunk in the one AVI chunk."

3. The image sound play reproducing apparatus according to claim 2, wherein the estimation includes a correction that corrects the "number of chunks other than the image chunk and the sound chunk in the one AVI chunk" to a "number of chunks other than the image chunk and the sound chunk in the one AVI chunk" as actually counted in an element that was already reproduced during a playing time of the AVI file.

4. The image sound reproducing apparatus according to claim 2,
wherein the sound reproducing apparatus incorporates a recording function, and
wherein the estimation includes a correction that corrects the "number of chunks other than the image chunk and the sound chunk in the one AVI chunk" to a "number of chunks other than the chunk and the sound chunk in the one AVI chunk" as actually counted in an element that was already recorded during a recording time of the AVI file.

5. The image sound reproducing apparatus according to claim 2, wherein the estimation acquires the "data amount of the idx1 chunk" and the "number of image chunks" contained in the AVI chunk, and estimates the "number of sound chunks in the one AVI chunk" according to a formula that calculates the "number of sound chunks in the one AVI chunk" by dividing the "data amount of the idx1 chunk" by a data amount per chunk and then subtracting from a resulting value the "number of image chunks" and the "number of chunks other than the image chunk and the sound chunk in the one AVI chunk."

\* \* \* \* \*